United States Patent [19]

Dearman

[11] 4,306,345

[45] Dec. 22, 1981

[54] PIPEFITTER'S TOOL

[76] Inventor: Timothy C. Dearman, P.O. Box 937, Pearland, Tex. 77581

[21] Appl. No.: 77,859

[22] Filed: Sep. 21, 1979

[51] Int. Cl.[3] .......................... B23Q 3/18; B23K 37/04

[52] U.S. Cl. ........................................ 29/272; 29/281.5; 228/49 R

[58] Field of Search .............. 29/272, 270, 282, 281.5; 81/5.1 R, 414–420; 269/203; 33/174 R; 228/49 R, 49 B

[56] References Cited

U.S. PATENT DOCUMENTS

| | | | |
|---|---|---|---|
| 460,230 | 9/1881 | Gunnarson | 81/426 X |
| 1,630,299 | 5/1927 | Johnson | 33/174 R |
| 2,678,501 | 5/1974 | Pistoles | 33/174 R |
| 3,964,352 | 6/1976 | Dukes | 81/426 |

OTHER PUBLICATIONS

"Dearman Spacing Tool for Socket Weld Fittings", an advertising brochure of Dearman Manufacturing Products, Inc., Flint, Michigan, 1974.

*Primary Examiner*—Howard N. Goldberg
*Assistant Examiner*—Kenneth J. Ramsey
*Attorney, Agent, or Firm*—Learman & McCulloch

[57] ABSTRACT

A tool for use by pipefitters in joining a length of pipe to a fitting in which one end of the pipe is accommodated with a predetermined spacing between the end of the pipe and an internal shoulder within the fitting. The tool comprises jaws which may be clamped on the pipe when the end of the latter abuts the shoulder and includes shims movable from a position spaced from the pipe toward the latter to occupy a position between the jaws and the adjacent free end of the fitting, thereby providing for a predetermined spacing between the free end of the pipe and the shoulder of the fitting.

8 Claims, 5 Drawing Figures

PIPEFITTER'S TOOL

BACKGROUND OF THE INVENTION

When a pipe is to be joined to a fitting having an internal shoulder it is common for the free end of the pipe to be inserted into the fitting to an extent sufficient to enable the end of the pipe to abut the shoulder. The pipe and fitting may not be welded together in such relative positions, however, because of the likelihood that the weld will crack or break due to thermal expansion and contraction of the pipe and fitting. Accordingly, it is the practice to provide a clearance between the free end of the pipe and the shoulder of the fitting, such clearance amounting to at least 1/16 inch according to most welding standards. If welds are to comply with such standards it is essential that the welder have some means of ensuring that the spacing between the shoulder of the fitting and the end of the pipe is not less than the minimum prior to and during welding of the pipe and fitting. To attain this objective welders heretofore have utilized many techniques with varying degrees of success. One technique is disclosed in U.S. Pat. No. 3,973,765 which makes use of a jig in which the fitting and the pipe are positioned prior to and during welding. Another technique heretofore employed utilizes a tool having a pair of clamping jaws between which a pipe to be welded to a fitting may be gripped. Associated with such jaws are a pair of pivoted fingers which may be swung to a position in which they are interposed between the associated clamp jaw and the free end of the fitting. In this construction, however, interference between the blade and the pipe could be encountered during movement of the fingers into their spacing position. Moreover, the fingers are exposed to the likelihood of being bent. Further, such tool is unable to accommodate pipes of significantly different diameters.

SUMMARY OF THE INVENTION

A tool constructed according to the invention comprises a hand held clamp having a pair of jaws movable toward and away from one another so as to clamp and unclamp, respectively, a pipe that is to be joined in telescoping relation to a fitting. The jaws are of V-shaped trough configuration, and of different size, and arranged so that the open sides of the jaws confront one another so as to receive a pipe therebetween. Corresponding ends of the jaws are coplanar and each jaw supports a mounting bracket on which is mounted at least one shim blade for sliding movements toward and away from the pipe. One side of each shim blade lies in the plane of the ends of the jaws and the thickness of the blade corresponds to the spacing to be provided between the free end of the pipe and an internal shoulder formed on the fitting. Each shim may include a plurality of blades of the same or different thicknesses, each of such blades being independent of the remainder.

DESCRIPTION OF THE DRAWINGS

A preferred embodiment of the invention is disclosed in the following description and in the accompanying drawings, in which.

DETAILED DESCRIPTION

Figure 1:
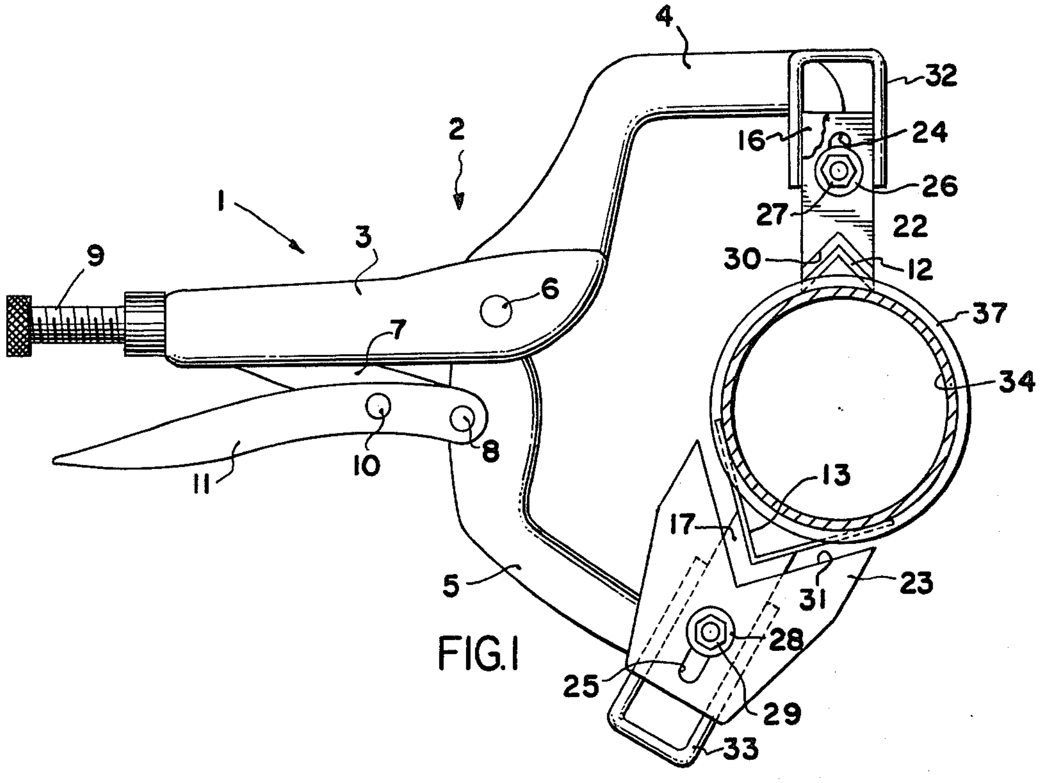
FIG. 1 is a side elevational view of a tool illustrating it clamped to a pipe, the pipe being shown in section.
Figure 2:
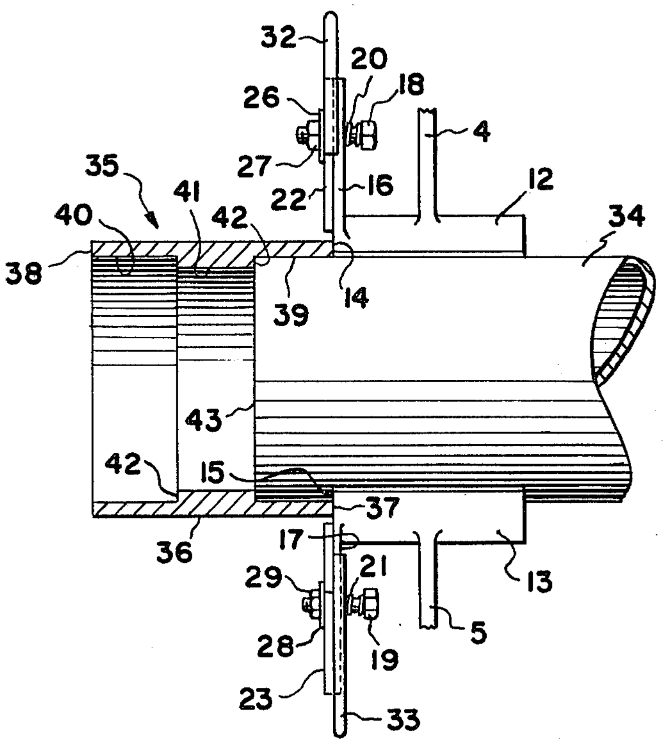
FIG. 2 is a view of the apparatus shown in FIG. 1 as viewed from the right of the latter, a fitting being shown in section.
Figure 3:
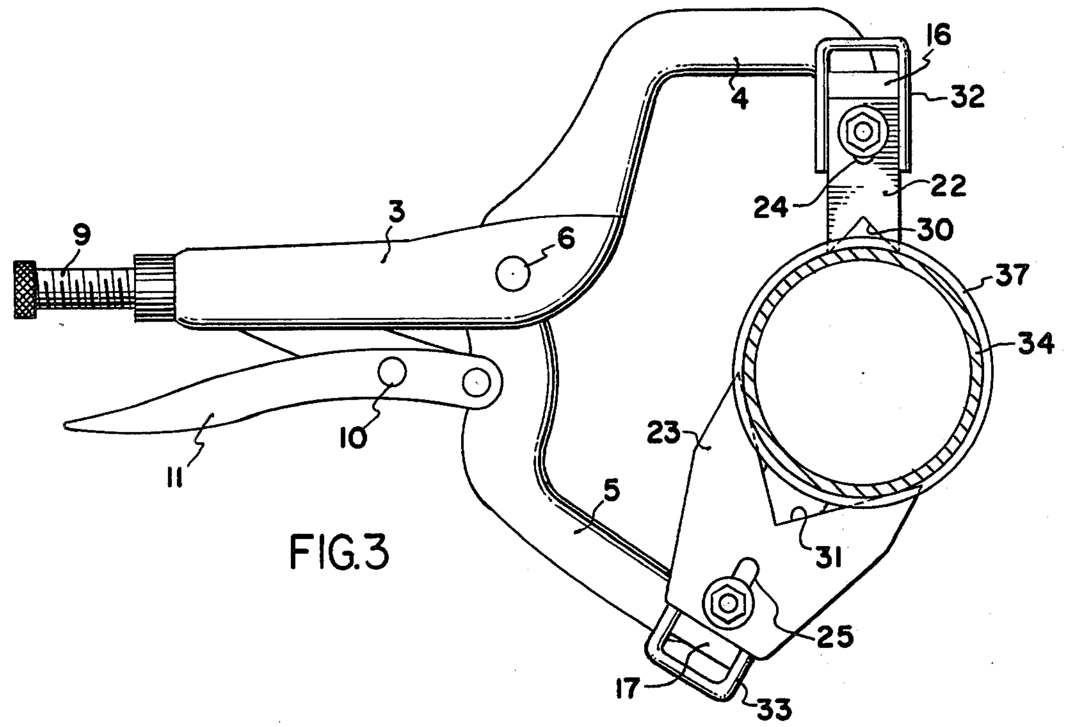
FIG. 3 is a view similar to FIG. 1, but with some of the parts in adjusted positions.

A tool constructed in accordance with the invention is designated generally by the reference character 1 and comprises a clamp 2 of known construction, such as disclosed in U.S. Pat. No. 2,641,149, having a handle 3 to one end of which is fixed an arm 4. A second arm 5 is pivoted to the handle 3 as at 6 so as to enable relative movement of the arms toward and away from one another. A link 7 has one end pivoted to the arm 5 as at 8 and its other end slidably fitted to the handle 3 for adjustment longitudinally of the latter by means of an adjusting screw 9. The link 7 also is pivoted as at 10 to an operating lever 11 which also is pivoted at 8 to the arm 5. The arrangement is such that the arms 4 and 5 may be moved toward one another so as to provide between the confronting ends of the arms a preselected spacing and the arms then may be latched in such position so as to prevent inadvertent extension of the spacing between the confronting ends on the arms.

The free end of the arm 4 is welded or otherwise suitably fixed to a V-shaped jaw 12 and the free end of the arm 5 is similarly fixed to a V-shaped jaw 13. The jaws 12 and 13 thus are trough-like in configuration with their open sides confronting one another. The limbs forming the jaw 13 preferably are substantially longer than the limbs of the jaw 12, for a purpose presently to be explained, but the length of each jaw preferably is uniform and the jaws are so arranged that corresponding ends 14 and 15, respectively, are coplanar.

Adjacent the end 14 of the jaw 12 is fixed an upstanding mounting bracket 16 and a similar mounting bracket 17 is fixed to the jaw 13 adjacent the end 15. The bracket 16 has an opening therein through which extends the shank of a bolt 18 and a similar bolt 19 extends through a similar opening in the bracket 17. A compression spring 20 reacts between the bracket 16 and the head of the bolt 18 and a similar spring 21 reacts between the bracket 17 and the head of the bolt 19.

In face to face linearly sliding movement with the bracket 16 is a shim blade 22 and a similar shim blade 23 is in linearly sliding face to face engagement with the bracket 17. The blades 22 and 23 have elongate slots 24 and 25, respectively, through which the shanks of the bolts 18 and 19 project, the bolt 18 having at its free end a washer 26 and an anchor nut 27. The bolt 19 has at its free end a similar washer 28 and a similar anchor nut 29. Each blade 22 and 23 thus is capable of limited sliding adjustment toward and away from one another and each blade will be frictionally retained in a selected position of adjustment by means of the biasing face exerted thereon by the associated springs 20 and 21. The nuts 27 and 29 may be removed from the associated bolts so as to enable blades of different thicknesses to be substituted for the blades 22 and 23.

The thickness of each blade 22 and 23 has a predetermined dimension to which reference will be made hereinafter, and the thickness of each blade preferably is uniform.

The width of the blade 22 preferably corresponds to the width between the limbs of the jaw 12 and that edge or end of the blade 22 which confronts the blade 23 preferably has a V-shaped notch 30 which matches the trough formed by the jaw 12. The blade 23 has a width corresponding to the width between the limbs of the jaw 13 and and end or edge having a V-shaped notch 31 which matches the trough formed by the jaw 13. A finger loop 32 is welded to the opposite sides of the blade 22 and extends beyond the latter so as slidingly to embrace the bracket 16, thereby providing a guide to ensure linear movement of the blade 22. A similar finger piece 33 is welded to that side of the blade 23 which confronts the bracket 17 and embraces the bracket 17 so as to provide a similar guide.

Figure 5:
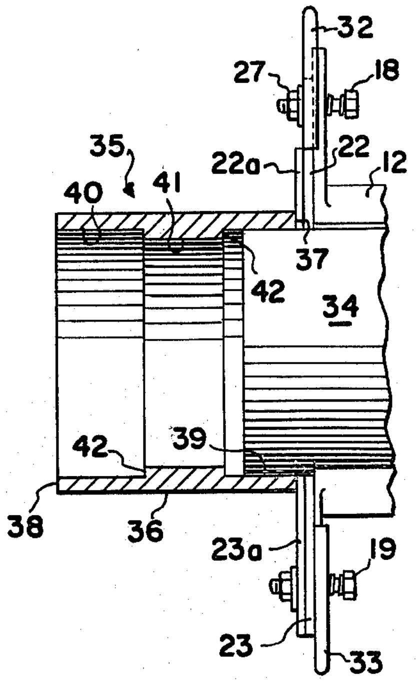
FIG. 5 is a view similar to FIG. 4, but illustrating an optional feature.

The construction shown in FIG. 5 is the same as that previously described with the exception that, in the embodiment of FIG. 5, the shims include additional blades 22*a*, 23*a* similar to the blades 22, 23 and which are slidable either with or independently of the associated blades 22 and 23. The thickness of the blades 22*a*, 23*a* preferably is uniform and may be either the same as or different from the thickness of the blades 22, 23.

Apparatus constructed in accordance with the invention is especially adapted for use in the welding of a pipe 34 to a fitting 35. The fitting may be a sleeve fitting, as shown, or it may be a tee, elbow, cross over, or any other kind of conventional fitting. The fitting 35 comprises a cylindrical body 36 having opposite ends 37 and 38 extending inwardly from which are bore portions 39 and 40. Between the ends of the body is a bore portion 41 of reduced diameter which forms shoulders 42 between the bore portions 39 and 40. The bore portion 39 is of such size as snugly to accommodate the end of the pipe 34 with the end 43 thereof abutting the adjacent shoulder 42.

To condition the apparatus for operation the arms 4 and 5 of the tool 1 are spread apart and the shim blades 22 and 23 are moved apart. The pipe 34 is fitted into the bore portion 39 of the fitting 35 so that the end 43 of the pipe abuts the shoulder 42. The jaws 12 and 13 then are moved toward one another so as to cause them to engage the pipe 34 with the ends 14 and 15 of the jaws abutting the end 37 of the fitting. The operating lever 11 is then actuated to clamp the jaws 12 and 13 against the pipe 34 so as to preclude inadvertent relative movement between the jaws and the pipe.

Figure 4:
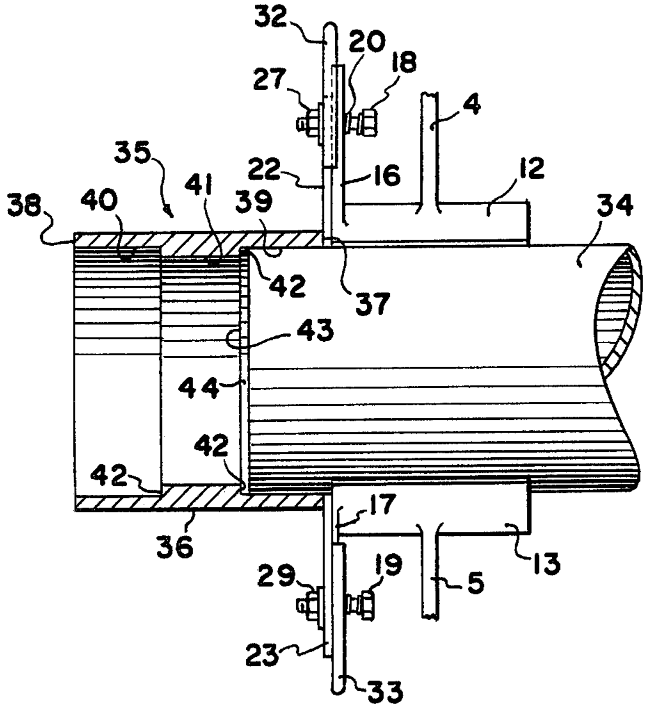
FIG. 4 is a view similar to FIG. 2, but illustrating the parts as they appear in FIG. 3.

Following the clamping of the jaws 12 and 13 against the pipe 34, the latter may be slid outwardly of the bore 39. The shim blades 22 and 23 (as well as the blades 22*a*, 23*a*, if desired) then may be slid toward one another, or radially of the pipe, to their operative positions in which their notched edges are flush with the jaws 12 and 13 bear against the pipe, following which the pipe 34 may be slid into the bore 39 toward the shoulder 42 until such time as the shim blades 22 and 23 abut the end 37 of the fitting. See FIG. 4. In this position of the pipe 34 a gap 44 will be provided between the shoulder 42 and the end 43 of the pipe and the axial length of the gap will correspond to the thickness of the shim blades. The pipe then may be tack welded to the fitting 35 in the peripheral spaces between the jaws 12 and 13 so as to ensure maintenance of the gap 44. Thereafter, the tool may be removed from the pipe 34 and the welding of the latter to the fitting completed.

Of particular advantage in a tool constructed according to the invention is the utilization of a clamp jaw 13 of greater size than that of the jaw 12. The larger jaw makes possible the accommodation of pipes of greatly differing diameters, the maximum diameter of the pipe being limited only by the maximum distance than the jaws 12 and 13 may be spaced from one another. A single tool, therefore, can be utilized by a pipe fitter in the coupling of pipes and fittings of greatly varying size.

The disclosed embodiment is representative of a presently preferred form of the invention, but is intended to be illustrative rather than definitive. The invention is defined in the claims.

I claim:

1. In a tool for use in joining a pipe to a fitting wherein one end of the pipe is to be accommodated in a bore at one end of the fitting and spaced a predetermined distance from a shoulder inwardly spaced from said one end of the fitting, said tool having a first clamp member, a second clamp member, means mounting said clamp members for movements toward and away from one another for respectively gripping and releasing said pipe, and spacing means carried by at least one of said clamp members for movements from positions out of and in engagement with said pipe, the improvement wherein said spacing means comprises shim means having a thickness corresponding substantially to said predetermined distance; and means mounting said shim means for adjustments along a linear path substantially radially of said pipe, said shim means comprising a plurality of separate members each of which is adjustable independently of the remainder.

2. A tool according to claim 1 including spring means acting on said shim means for yieldably maintaining the latter in a selected position of adjustment.

3. A tool according to claim 1 wherein the mounting means for said shim means is separable from the latter to permit substitution for said shim means of another having a different thickness.

4. A tool according to claim 1 wherein the thickness of each of said separate members is substantially uniform.

5. A tool according to claim 1 wherein the thickness of each of said separate members is different.

6. A tool according to claim 1 wherein each of said clamp members has a substantially trough-shaped configuration, said members being so arranged that the open sides of the troughs confront one another.

7. A tool according to claim 1 wherein each of said clamp members has limbs forming a V-shaped trough.

8. A tool according to claim 7 wherein the limbs of one of said clamp members are longer than the limbs of the other of said clamp members.

* * * * *